UNITED STATES PATENT OFFICE.

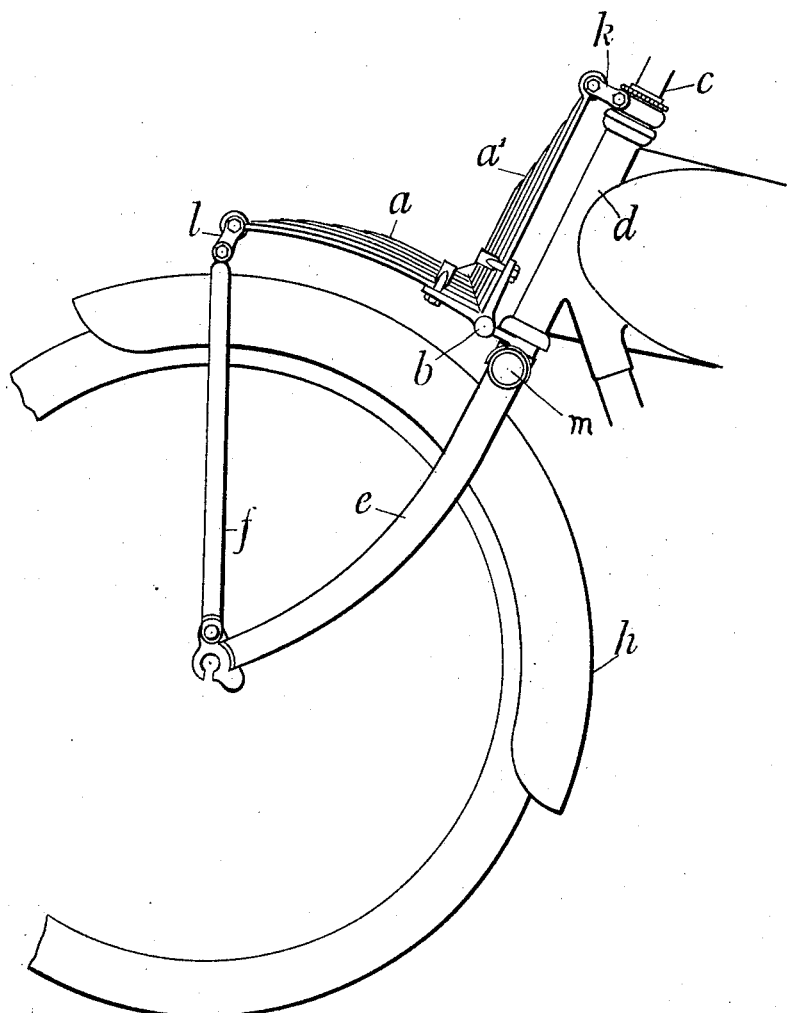

FRANK EDWARD BAKER AND THEODORE JAMES BIGGS, OF BIRMINGHAM, ENGLAND.

SPRING-MOUNTING FOR MOTORCYCLE FRONT WHEELS.

1,401,032.     Specification of Letters Patent.     Patented Dec. 20, 1921.

Application filed February 10, 1920. Serial No. 357,611.

(GRANTED UNDER THE PROVISIONS OF THE ACT OF MARCH 3, 1921, 41 STAT. L., 1313.)

*To all whom it may concern:*

Be it known that we, FRANK EDWARD BAKER and THEODORE JAMES BIGGS, both residing at Precision Works, King's Norton, in the city of Birmingham, England, subjects of the King of Great Britain and Ireland, have invented certain new and useful Improvements Relating to Spring-Mountings for Motorcycle Front Wheels, (for which we have filed application in Great Britain, January 9, 1918, Patent No. 116,234,) of which the following is a specification.

This invention has for its object to provide an improved spring mounting for the front wheel of a motor cycle.

The accompanying drawing illustrates a front wheel mounting constructed in accordance with this invention.

A curved laminated spring *a* is arranged over and above the rim of the wheel and secured at its rear end to a lug *b* hinged at the lower end of the fork stem or steering column *c* passing through the head tube *d* of the cycle frame. The usual fork *e* hinged at *m* to the lower end of the fork stem *c* has the wheel axle secured to its lower end in the usual manner. The forward end of the spring is secured by a link *l* to a strut *f* attached to the lower end of the fork. The mudguard *h* is attached to the parts *e* and *f*. It will be understood that there is a member *f* on each side of the wheel. A right angle extension *a'* of the spring originating at the connection with the lower end of the steering column or stem *c* rises parallel with the tube *d* and at its upper end is connected by a link *k* with the upper end of the stem *c*.

Having thus described our invention what we claim as new and desire to secure by Letters Patent is:—

1. In a spring mounting for the front wheel of a motor cycle the combination comprising a laminated spring arranged over and above the rim of the wheel and hinged to the lower end of the fork stem, a strut connecting the outer end of the spring to the lower end of the fork, and a right angle laminated extension of the spring connected to the upper end of the fork stem, substantially as described.

2. In a spring mounting for the front wheel of a motor cycle, the combination comprising a laminated spring arranged over and above the wheel rim, a lug hingedly connecting the rear end of the spring to the lower end of the fork stem, a strut having its lower end connected to the lower end of the fork, a link connecting the front end of the spring to the upper end of the strut, a laminated extension arranged at right angles to the said spring and situated in front of the head tube, and a link connecting the upper end of the extension with the upper end of the fork stem, substantially as described.

In testimony whereof we have signed our names to this specification.

FRANK EDWARD BAKER.
THEODORE JAMES BIGGS.